(12) United States Patent
Khankin et al.

(10) Patent No.: US 12,536,248 B1
(45) Date of Patent: Jan. 27, 2026

(54) DEVICE AND METHOD OF COMPUTING AN OUTPUT VALUE OF A MATHEMATICAL FUNCTION, AND METHOD OF DESIGNING AN INTEGRATED CIRCUIT FOR THE SAME

(71) Applicant: NEXT SILICON LTD., Givatayim (IL)

(72) Inventors: Daniel Khankin, Beer Sheva (IL); Aharon Abadi, Petah Tiqwa (IL)

(73) Assignee: Next Silicon Ltd, Givatayim (IL)

( * ) Notice: Subject to any disclaimer, the term of this patent is extended or adjusted under 35 U.S.C. 154(b) by 0 days.

(21) Appl. No.: 19/057,696

(22) Filed: Feb. 19, 2025

(51) Int. Cl.
*G06F 17/17* (2006.01)
*G06F 30/32* (2020.01)

(52) U.S. Cl.
CPC ............. *G06F 17/17* (2013.01); *G06F 30/32* (2020.01)

(58) Field of Classification Search
CPC .. G06F 17/17; G06F 2101/04; G06F 2101/08; G06F 2101/10; G06F 1/03; G06F 1/0397; G06N 3/048
See application file for complete search history.

(56) References Cited

U.S. PATENT DOCUMENTS

| | | | | |
|---|---|---|---|---|
| 8,190,669 B1 * | 5/2012 | Oberman | ............... | G06F 9/3895 708/277 |
| 10,168,990 B1 * | 1/2019 | Annamalai | ............... | G06F 1/03 |
| 2004/0260523 A1 * | 12/2004 | Yang | ............... | G06F 30/367 703/2 |
| 2019/0310827 A1 * | 10/2019 | Gagliano | ............... | G06F 17/14 |
| 2021/0406662 A1 | 12/2021 | Timofejevs et al. | | |
| 2021/0406667 A1 | 12/2021 | Timofejevs et al. | | |
| 2023/0081715 A1 | 3/2023 | Timofejevs et al. | | |
| 2025/0060941 A1 * | 2/2025 | Pasca | ............... | G06F 7/556 |
| 2025/0139197 A1 * | 5/2025 | Diamond | ............... | G06F 17/17 |

OTHER PUBLICATIONS

D.U. Lee et al., Hierarchical Segmentation Schemes for Function Evaluation, 2003 IEEE International Conference on Field-Programmable Technology (FPT), 2003 (Year: 2003).*

(Continued)

*Primary Examiner* — Emily E Larocque

(57) ABSTRACT

An integrated circuit (IC) for computing an output value $Y_1$ of a mathematical function, for a given input value $X_1$, defined over an approximation interval $I_1$, may include: (i) a look-up table (LUT) circuit with multiple entries, each corresponding to a segment of $I_1$, (ii) a polynomial computation circuit configured to calculate a polynomial estimation of the function in a reference segment, and (iii) a processor. The processor may obtain a query for computing $Y_1$ and select a segment based on $X_1$. It may retrieve a preliminary approximation of $Y_1$ from the LUT and calculate an offset of $X_1$ within the selected segment. The processor may employ the polynomial computation circuit to calculate a polynomial estimation on the offset value, thereby obtaining a correction value. The processor may proceed to compute $Y_1$ based on the preliminary approximation and the correction value.

12 Claims, 6 Drawing Sheets

(56) References Cited

OTHER PUBLICATIONS

H. Dong et al., PLAC: Piecewise Linear Approximation Computation for All Nonlinear Unary Functions, IEEE Transactions on Very Large Scale Integration (VLSI) Systems, vol. 28, No. 9, 2020 (Year: 2020).*

Muller, J.-M. (2016). Elementary Functions: Algorithms and Implementation. 3rd Edition. Birkhäuser Boston, MA. Springer Science+Business Media New York 2016. https://doi.org/10.1007/978-1-4899-7983-4.

Tang, P.-T. P. 1989. Table-driven implementation of the exponential function in IEEE floating-point arithmetic. ACM Trans. Math. Softw. 15, 2 (Jun. 1989), 144-157. https://doi.org/10.1145/63522.214389.

Devor et al. "A Probalistic Model for Rounding Errors: A New Look at the Table-Maker's Dilemma", Proceedings of the 8th International Symposium of Cyber Security, Cryptology, and Machine Learning, CSCML 2024, Be'er Sheva, Israel, Dec. 19-20, 2024, p. 190-200, Dec. 19, 2024.

Khankin et al. "Efficient CORDIAC-Based Shine and Cosine Implementation for A Dataflow Architecture (Extended Abstract)", Cyber Security Cryptography and Machine Learning, Conference Paper, LNCS, 12161: 128-142, Published Online Jun. 25, 2020.

* cited by examiner

DEVICE AND METHOD OF COMPUTING AN OUTPUT VALUE OF A MATHEMATICAL FUNCTION, AND METHOD OF DESIGNING AN INTEGRATED CIRCUIT FOR THE SAME

FIELD OF THE INVENTION

The present invention relates generally to computational systems. More specifically, the present invention relates to a method, a device (e.g., an Integrated Circuit (IC)), and method of designing an IC, for efficiently computing an output value of a mathematical function.

BACKGROUND OF THE INVENTION

In modern computational systems, the efficient and accurate computation of mathematical functions is important for a wide range of applications, such as scientific computing, signal processing, and machine learning. Traditional methods for computing these functions often rely on iterative algorithms or direct evaluation, which can be computationally intensive and time-consuming.

One common approach for improving computational efficiency is the use of Look-Up Tables (LUTs), where precomputed values of a function are stored and retrieved as needed. However, the accuracy of LUT-based methods is limited by the granularity of the stored values and the size of the LUT, which can lead to significant memory usage and potential inaccuracies due to interpolation errors.

SUMMARY OF THE INVENTION

To address these challenges, embodiments of the present invention introduce a novel LUT-based method for function approximation that combines precomputed values with polynomial approximations. This method allows for efficient and accurate computation of mathematical functions over arbitrary intervals, both finite and infinite, by leveraging a known interval for precomputation, and a mapping function to handle arbitrary input values.

Embodiments of the invention may subdivide the given interval into subintervals, and store endpoint values of the mathematical function for each subinterval. Embodiments of the invention may then apply a mapping operator to compute the subinterval index and offset. By using a combination of LUT entries and polynomial approximations, embodiments of the invention may achieve high accuracy while minimizing memory usage and computational overhead.

Embodiments of the invention may also include an embedded hardware solution, such as an integrated circuit (IC), for implementing this method of efficient function approximation. The IC may leverage LUT and polynomial computation circuits to deliver fast and accurate results, making it suitable for a wide range of applications where computational efficiency, storage space and computation accuracy are critical.

Embodiments of the invention may further include a method for designing, and optionally generating such an IC for efficient function approximation.

Overall, the present invention offers a practical application, and provides significant advancement in the technological field of computational systems, facilitating a robust and efficient method for approximating mathematical functions with high accuracy and low resource consumption.

Embodiments of the invention may include a method of computing an output value $Y_1$ of a mathematical function by at least one processor. The at least one processor may be configured to obtain a query for computing the output value $Y_1$ for a given input value $X_1$, where $X_1$ may be within an approximation interval $I_1$.

The at least one processor may obtain a look-up table (LUT) that may include a plurality of entries, corresponding to a respective plurality of unique segments of the approximation interval $I_1$. Additionally, or alternatively, the at least one processor may obtain at least one polynomial, representing an approximation of the mathematical function in a respective reference segment of the plurality of segments.

The at least one processor may select a segment of the plurality of segments based on the input value $X_1$, and retrieve from the LUT a preliminary approximation of the output value $Y_1$, based on that selection.

The at least one processor may subsequently calculate an offset value of the input value $X_1$ within the selected segment, and apply the at least one polynomial on the offset value, to obtain a correction value. The at least one processor may proceed to compute the output value $Y_1$ based on the preliminary approximation and the correction value, as elaborated herein.

According to some embodiments, a length of at least one first segment of the plurality of segments, and a length of at least one second segment of the plurality of segments may be unequal, or uneven.

According to some embodiments, the at least one processor may receive at least one accuracy requirement, and define a maximal value of an error metric for approximating the mathematical function. The at least one processor may receive at least one resource requirement, defining a constraint of computational resource in approximating the mathematical function. The at least one processor may determine the number of entries of the LUT based on the at least one accuracy requirement and the at least one resource requirement. The at least one processor may subsequently calculate, for each entry of the LUT, a value of output $Y_1$ at the corresponding segment, thereby producing, or obtaining the content of the LUT.

According to some embodiments, the at least one processor may calculate a complexity value, representing variation (e.g., curvature, rapid changes, or inflection points) of the mathematical function at one or more regions along the approximation interval $I_1$. Based on the complexity value, the at least one processor may determine a length of the one or more segments of the plurality of segments.

Additionally, or alternatively, the at least one processor may receive an accuracy requirement, defining a maximal value of an error metric for approximating the mathematical function within the reference segment.

Based on the accuracy requirement, the at least one processor may determine a minimal degree of the polynomial.

The at least one processor may apply an iterative algorithm or process to calculate the polynomial. Each iteration of the process may include: (i) calculating the polynomial's accuracy in approximating the mathematical function within the reference segment, and (ii) increasing the polynomial degree, until the polynomial's approximation accuracy satisfies the accuracy requirement.

Additionally, or alternatively, the at least one processor may receive at least one resource requirement, defining a constraint of computational resource in approximating the mathematical function within the reference segment, and increase the polynomial degree as long as the computational resource is satisfied.

According to some embodiments, the at least one processor may obtain the query for computing the output value $Y_1$ by receiving an initial query for calculating a target value $Y_0$ of the mathematical function at an arbitrary input value $X_0$, within an arbitrary interval $I_0$, and applying a range reduction algorithm on the arbitrary input value $X_0$, to calculate the input value $X_1$. As explained herein, input value $X_1$ may represent the initial, arbitrary input value $X_0$ within the approximation interval $I_1$.

Additionally, or alternatively, the at least one processor may apply a projection algorithm on the output value $Y_1$, to calculate the target value $Y_0$ of the mathematical function at the initial, arbitrary input value $X_0$, and provide the target value $Y_0$ as a response to the initial query.

Embodiments of the invention may include a device, such as an electrical circuit, or an integrated circuit (IC) device, for computing an output value $Y_1$ of a mathematical function, for a given input value $X_1$ defined over an approximation interval $I_1$. According to some embodiments, the device may include a look-up table (LUT) circuit, having a plurality of entries, each corresponding to a respective segment of a plurality of segments of the approximation interval $I_1$. Additionally, or alternatively, the device may include a polynomial computation circuit, configured to calculate a polynomial estimation of the mathematical function in a reference segment of the plurality of segments, and at least one processor.

As elaborated herein, the at least one processor may be configured to obtain a query for computing the output value $Y_1$, select a segment of the plurality of segments, based on the input value $X_1$, and retrieve, from the LUT, a preliminary approximation of the output value $Y_1$, based on the selected segment. The at least one processor may further calculate an offset of input value $X_1$ within the selected segment; employ the polynomial computation circuit, to calculate a polynomial estimation of the mathematical function on the offset value, thereby obtain a correction value; and compute the output value $Y_1$ based on the preliminary approximation and the correction value.

According to some embodiments, the number of LUT entries may be determined based on (i) a required accuracy of the output value $Y_1$, and (ii) a computational resource (e.g., an area) constraint on the device.

Embodiments of the invention may further include a method of generating, or designing, by at least one processor, an IC for approximating an output value $Y_1$ of a mathematical function. According to some embodiments of the invention, the at least one processor may obtain a definition of the mathematical function over an approximation interval $I_1$. The processor may further receive (i) at least one resource requirement, defining a limitation of computational resources for computing the output value $Y_1$, and/or (ii) at least one accuracy requirement, defining a minimal value of an accuracy metric for approximating the output value $Y_1$.

Based on the at least one resource requirement, the processor may generate a LUT schematic, represent a LUT circuit that may include a plurality of entries. Each entry may (a) correspond to a respective, unique segment of the approximation interval $I_1$, and (b) be adapted to maintain at least one precalculated value of output $Y_1$ at the corresponding segment.

The at least one processor may generate a polynomial schematic, represent a polynomial circuit that may be adapted to calculate a polynomial estimation of the mathematical function in a reference segment of the plurality of segments, in accordance with the at least one accuracy requirement.

The at least one processor may further generate a processor schematic, represent at least one on-chip processor, adapted to be in communication with the LUT circuit and the polynomial circuit; and produce modules of instruction code, executable by the at least one on-chip processor. Upon execution of said modules of instruction code, the at least one on-chip processor may be configured to employ the LUT circuit and the polynomial circuit, so as to approximate the output value $Y_1$ of the mathematical function.

According to some embodiments, producing the modules of instruction code may include configuring the at least one on-chip processor to: obtain a query for computing the output value $Y_1$ for a given input value $X_1$ within interval $I_1$; calculate an index of a specific segment of the plurality of segments, based on the input value $X_1$; select the specific segment; and retrieve a preliminary approximation of the output value $Y_1$ from the LUT circuit, based on the selected segment.

Additionally, or alternatively, producing the modules of instruction code may include configuring the at least one on-chip processor to further: calculate an offset value of the input value $X_1$ within the selected segment; employ the polynomial circuit on the offset value, to obtain a correction value; and compute the output value $Y_1$ based on the preliminary approximation and the correction value.

The selected segment and reference segment may, or may not be the same segments of the plurality of segments. In other words, embodiments of the invention may use a polynomial, that was calculated for the reference segment, to approximate a correction value of a point that pertains to a different, selected segment.

The at least one processor may calculate the polynomial in an iterative process, where each iteration includes the following steps:

Calculating coefficients of an interim polynomial, having a degree pertaining to the current iteration, and adapted to approximate the mathematical function in said reference segment. This may be followed by computing an error value, representing the interim polynomial's approximation error in approximating the mathematical function. The iterative process may be repeated with an increased degree, until the approximation error value satisfies the accuracy requirement, to obtain a final version of the polynomial.

The at least one processor may generate the polynomial schematic to calculate the polynomial estimation of the mathematical function, based on the final version of the polynomial. The processor schematic, polynomial schematic, and LUT schematic may be adapted to be translated into a physical layout design, utilizable for fabricating said IC for approximating an output value of the mathematical function.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
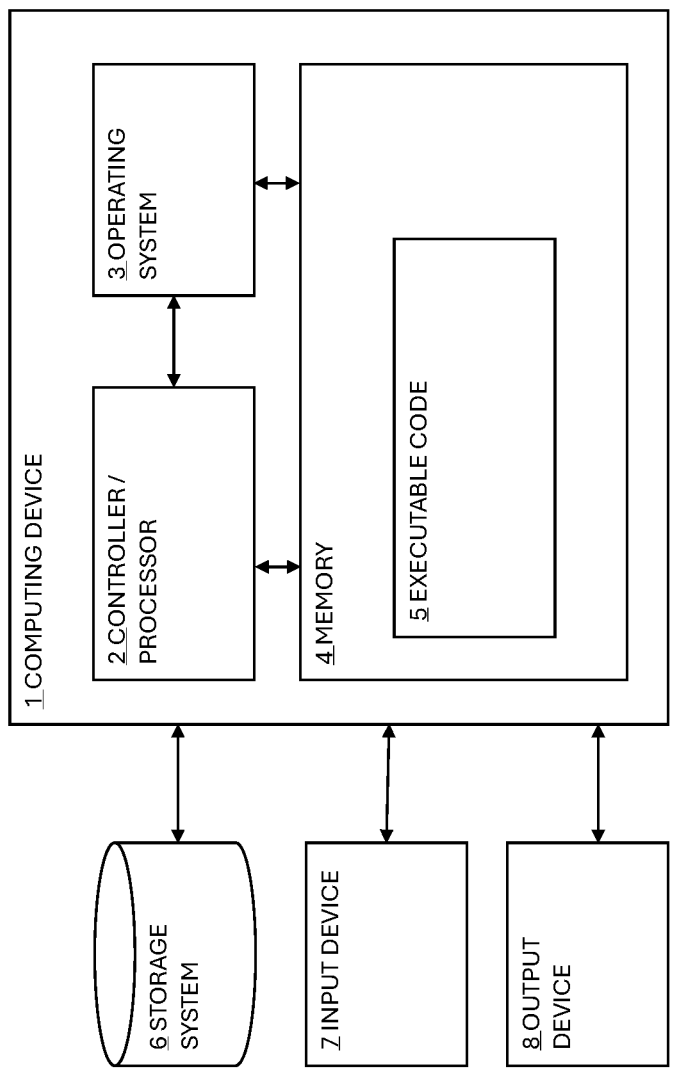
FIG. 1 is a block diagram, depicting a computing device which may be included in a system for computing an output value of a mathematical function, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items.

Unless explicitly stated, the method embodiments described herein are not constrained to a particular order or sequence. Additionally, some of the described method embodiments or elements thereof can occur or be performed simultaneously, at the same point in time, or concurrently.

Reference is now made to FIG. 1, which is a block diagram depicting a computing device 1, which may be included within an embodiment of a system for computing an output value of a mathematical function, according to some embodiments. Additionally, or alternatively, computing device 1, may be included within an embodiment of a system for designing an integrated circuit (IC) for calculating an output value of a mathematical function, as elaborated herein.

Computing device 1 may include a processor or controller 2 that may be, for example, a central processing unit (CPU) processor, a chip or any suitable computing or computational device, an operating system 3, a memory 4, executable code 5, a storage system 6, input devices 7 and output devices 8. Processor 2 (or one or more controllers or processors, possibly across multiple units or devices) may be configured to carry out methods described herein, and/or to execute or act as the various modules, units, etc. One or more computing devices 1 may be included in, and may act as, the components of a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random-Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of possibly different memory units. Memory 4 may be a computer or processor non-transitory readable medium, or a computer non-transitory storage medium, e.g., a RAM. In one embodiment, a non-transitory storage medium such as memory 4, a hard disk drive, another storage device, etc. may store instructions or code which when executed by a processor may cause the processor to carry out methods as described herein.

Executable code 5 may be any executable code, e.g., an application, a program, a process, task, or script. Executable code 5 may be executed by processor or controller 2 possibly under control of operating system 3.

For example, executable code 5 may be an application that may compute an output value of a mathematical function, according to some embodiments.

In another example, executable code 5 may be included within an embodiment of a system for designing an IC, for calculating an output value of a mathematical function, as further described herein.

Although, for the sake of clarity, a single item of executable code 5 is shown in FIG. 1, a system according to some embodiments of the invention may include a plurality of executable code segments similar to executable code 5 that may be loaded into memory 4 and cause processor 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit.

Data pertaining to calculation of a mathematical function may be stored in storage system 6 and may be loaded from storage system 6 into memory 4 where it may be processed by processor or controller 2.

In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components, or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., similar to element 2), a plurality of input units, a plurality of output units, a plurality of memory units, and a plurality of storage units.

Figure 2:
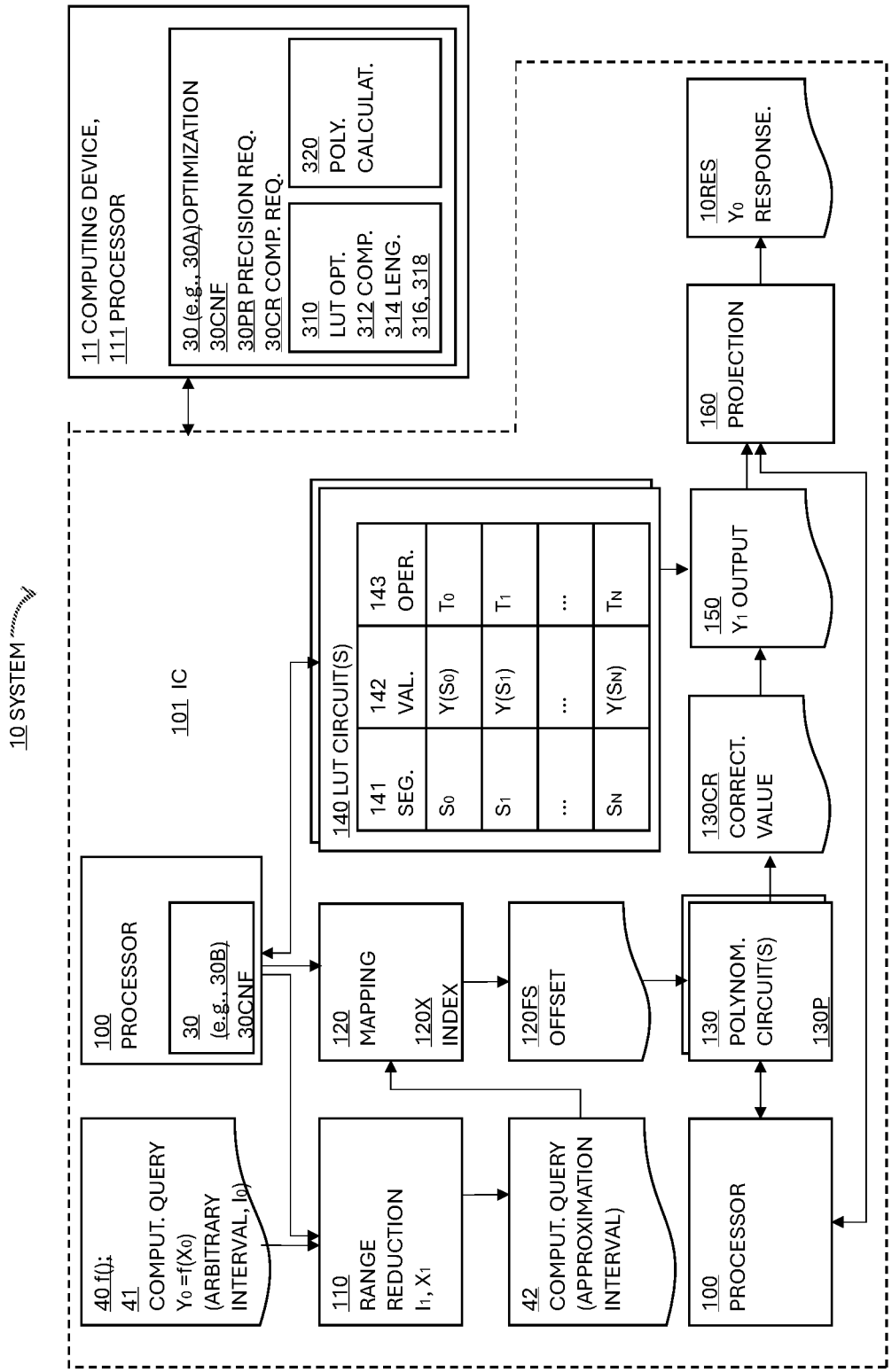
FIG. 2 is a block diagram, depicting a system (e.g., an integrated circuit (IC)) for computing an output value of a mathematical function, according to some embodiments of the invention.

Reference is now made to FIG. 2, which depicts a system 10 for calculating an output value 10RES of a mathematical function 40 (e.g., Y=f(X)), according to some embodiments of the invention.

According to some embodiments, system 10 may be implemented as a software module, a hardware module, or any combination thereof.

For example, system 10 may be implemented as an IC 101, or as one or more modules within an IC. In this context, the terms "system 10" and "IC 101" may be used interchangeably.

Additionally, or alternatively, system 10 (e.g., IC 101) may include, or may be associated with (e.g., communicatively connected to) at least one computing device 11 such as computing device 1 of FIG. 1.

In such embodiments, computing device 11 may be configured to calculate an optimal configuration of one or more components (e.g., LUT circuit(s) 140, polynomial approximation circuit(s) 130) of IC 101, as elaborated herein. IC 101 may communicate with at least one processor 111 (such as processor 2 of FIG. 1) of computing device 11, to receive the calculated optimal configuration, and adapt the structure and/or functionality of respective components (e.g., LUT circuit(s) 140, polynomial approximation circuit(s) 130) accordingly.

According to some embodiments, IC 101 may include at least one embedded, on-chip processor 100 such as processor 2 of FIG. 1. It may be noted that "processor 100" entities in FIG. 2 may represent the same (e.g., a single) processing unit, or two or more different processing units, according to the specific implementation.

As elaborated herein, the at least one processor 100 may be adapted to execute one or more modules of executable code (e.g., element 5 of FIG. 1) so as to employ one or more modules of IC 101, for calculating an output value 10RES of a mathematical function 40.

Additionally, or alternatively, the at least one processor 100 may be adapted to configure the structure and/or functionality of one or more components of IC 101.

For example, IC 101 may be, or may include one or more configurable logic elements. IC 101 may, for example, include a Field-Programmable Gate Array (FPGA), allowing fine-grained reconfigurability, and/or a Coarse-Grained Reconfigurable Architecture (CGRA), allowing run-time reconfiguration of functional elements within IC 101.

In such embodiments, the at least one processor 100 may be adapted to calculate an optimal configuration of one or more components (e.g., LUT circuit(s) 140, polynomial approximation circuit(s) 130) of IC 101, as elaborated herein, and may trigger reconfiguration of the respective components, in accordance with the calculated, optimal configuration. The term "optimal" may be used in this context to indicate a configuration that may exhibit superior performance, in relation to a predetermined metric, as known in the art. Such a metric may include, for example a minimal consumed power, a minimal consumed area, a maximal throughput, a minimal latency, and the like.

Arrows of FIG. 2 may represent flow of one or more data elements to and from system 10 and/or among modules or elements of system 10. Some arrows have been omitted on FIG. 2 for the purpose of clarity.

Figure 3:
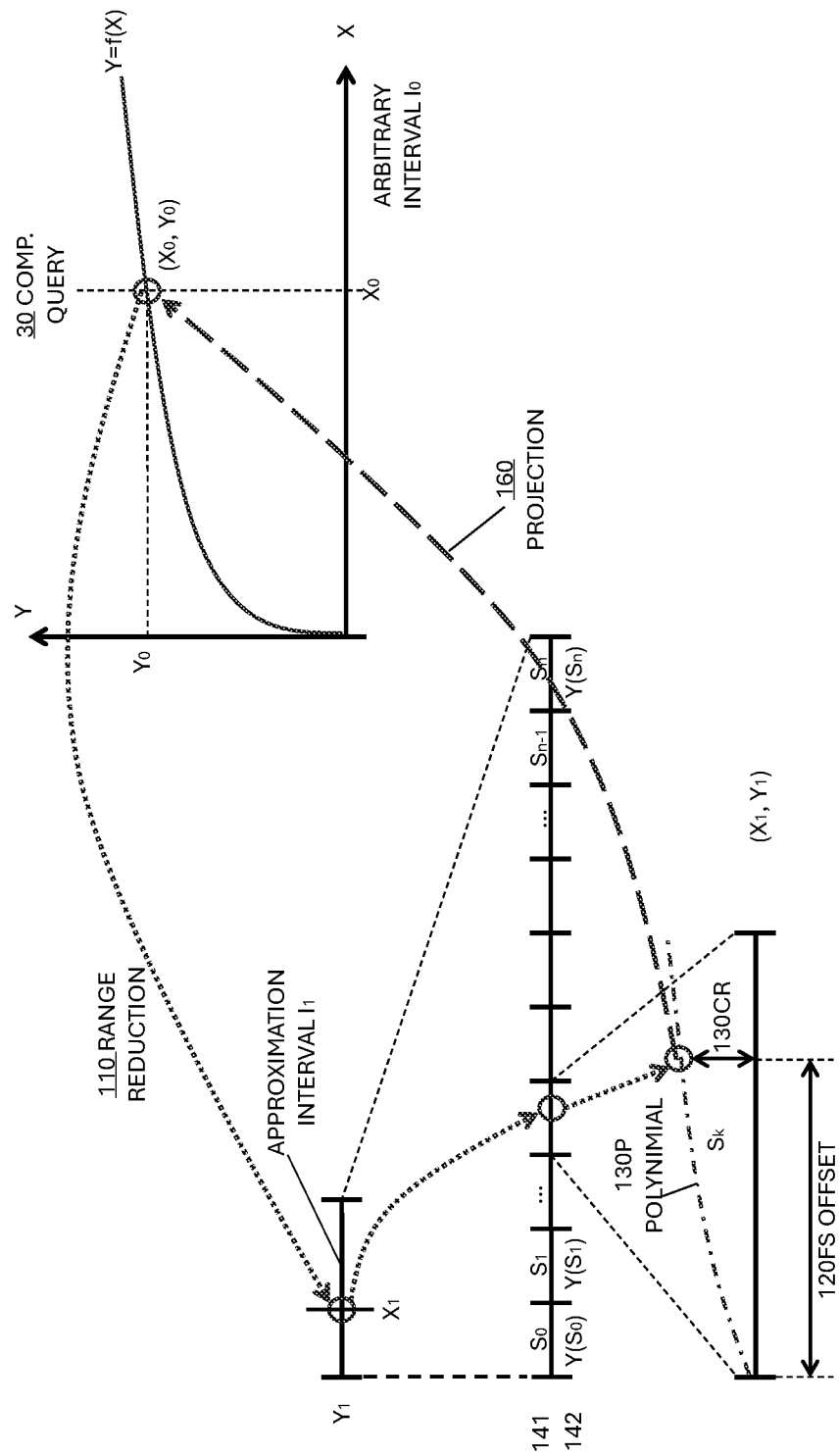
FIG. 3 is a schematic diagram, depicting a process of computing an output value of a mathematical function, according to some embodiments of the invention.

Reference is also made to FIG. 3, which is a schematic diagram, depicting a process of computing an output value of a mathematical function 40, according to some embodiments of the invention.

As shown in FIG. 2 and FIG. 3, system 10 may receive an initial query for calculating a target value $Y_0$ of a mathematical function 40 'f', at an arbitrary input value $X_0$, within an arbitrary, finite or infinite interval $I_0$, as in Eq. 1 below:

$$Y_0 = f(X_0) \qquad \text{Eq. 1}$$

As explained herein, system 10 may be configured to transform the input value $X_0$, that lies within the arbitrary interval $I_0$ into a corresponding value $X_1$, within a predefined, approximation interval $I_1$, in a process that is commonly referred to in the art as "range reduction".

Approximation interval $I_1$ may be a finite interval (e.g., [0,1] or [1,2)), typically smaller than the initial, arbitrary interval $I_0$. The specific process of transformation by range reduction and projection may depend on the nature of the function being approximated, and is known in the art.

As a non-limiting example, consider a computational query 41 for calculating a value of a logarithmic function. In this example, the mathematical function 40 may be the logarithmic function, and computational query 41 may require computation of $Y_0$, given an input value $X_0$ (e.g., $Y_0 = \log(X_0)$).

Input value $X_0$ may be decomposed as in Eq. 2 below:

$$X_0 = (X_1 \times 2^n),\qquad \text{Eq. 2}$$

where $X_1 \in I_1$ (e.g., $I_1 = [1,2)$), and n is an integer (e.g., the exponent in a floating-point representation of $X_0$).

The logarithmic function may thereby be written as in Eq. 2 below:

$$\log(X_0) = \log(X_1 \times 2^n) = \log(X_1) + (n \times \log(2)).\qquad \text{Eq. 3}$$

During range reduction, the arbitrary range $I_0$ may be scaled, or reduced to the smaller range $I_1$ (e.g., [1,2)), also referred to herein as the "approximation range". In other words, input value $X_0$ of arbitrary range $I_0$ may be mapped to $X_1$ within approximation range $I_1$.

System 10 may then compute the logarithmic term of Eq. 4

$$Y_1 = \log(X_1),\qquad \text{Eq. 4}$$

using approximation techniques, as elaborated herein.

In a subsequent projection stage, system 10 may provide the response 10RES (e.g., $Y_0$) for computational query 41 of the mathematical function 40 (e.g., the logarithmic function) over the initial, arbitrary range $I_0$ as in Eq. 5 below:

$$Y_0 = Y_1 + (n \times \log(2)).\qquad \text{Eq. 5}$$

It may be appreciated that other processes of range reduction (and subsequent projection) may also be possible, for other mathematical functions (e.g., exponential functions, trigonometric functions, etc.), input ranges $I_0$, and approximation ranges $I_1$, as known in the art.

As shown in FIG. 2, system 10 may receive an initial computational query 41 for computing the output value $Y_0$ for a given input value $X_0$, within arbitrary range $I_0$. As explained herein, system 10 may apply a range reduction algorithm 110 on input value $X_0$, to calculate an input value $X_1$ within approximation range $I_1$.

In other words, system 10 (e.g., processor 100 of IC 101) may obtain an alternative query 42 for computing the output value $Y_1$ for a given input value $X_1$ (as in Eq. 4 above, for the example of a logarithmic function), where $X_1$ is within approximation interval $I_1$.

Input value $X_1$ may be regarded as representing the arbitrary input value $X_0$ within approximation interval $I_1$. System 10 (IC 101) may be adapted to compute an output value $Y_1$ of a mathematical function 40 (e.g., Eq. 4 above, for the example of a logarithmic function), for a given input value $X_1$ defined over approximation interval $I_1$.

As shown in FIG. 2, system 10 may include at least one look-up table (LUT) module 140. For example, system 10 may be implemented as, or may include an electrical circuit such as an IC 101, and the at least one LUT module may be implemented as a LUT circuit 140 within IC 101. In this context, the terms "LUT module 140" and "LUT circuit 140" may be used interchangeably.

Each LUT module 140 may be associated with a specific mathematical function 40. For example, IC 101 may include a plurality of LUT circuits 140, each adapted to handle computational queries 42 of respective mathematical functions (e.g., logarithm functions, trigonometric functions, exponential functions, and the like).

LUT circuit 140 may include a plurality of entries, each corresponding to a respective segment 141 of a plurality of unique segments 141 (denoted $S_0, S_1, \ldots S_n$) of approximation interval $I_1$.

Each entry of LUT circuit 140 may include at least one preliminary approximation value 142 of the output value $Y_1$, corresponding to the respective segment of approximation interval $I_1$.

Preliminary approximation values 142 are denoted $Y(S_0)$, $Y(S_1), \ldots Y(S_n)$ in FIGS. 2 and 3, and are also referred to as "LUT approximation values 142".

LUT approximation values 142 may be precalculated values of the specific mathematical function 40 (e.g., logarithmic function, exponential function) at specific points (e.g., start points, mid-points, end points) of the respective segments 141 ($S_0, S_1, \ldots S_n$) in approximation interval $I_1$.

Pertaining to the example of the logarithmic mathematical function 40 brought above, preliminary approximation values 142 may be precalculated values of $\log(X_1)$ at endpoints of each segment 141 ($S_0, S_1, \ldots S_n$).

Additionally, or alternatively, LUT circuit 140 may include, for each segment entry 141 ($S_0, S_1, \ldots S_n$) a corresponding mapping operator value 143, adapted to allow projection of the approximated value $Y_1$ back to arbitrary interval $I_0$ (e.g., to obtain $Y_0$).

Pertaining to the example of the logarithmic mathematical function 40 brought above, mapping operator value 143 may be the term $n \times \log(2)$ in Eq. 3.

According to some embodiments, system 10 (e.g., processor 100 of IC 101) may employ a mapping module 120, configured to select a segment 141 (e.g., $S_k$) of the plurality of segments 141 ($S_0, S_1, \ldots S_n$) based on the input value $X_1$.

In other words, mapping module 120 may calculate an index 120X (denoted k) of a segment 141 (e.g., $S_k$) which corresponds to a location of input value $X_1$ within approximation interval $I_1$.

For example, interval $I_1$ may be defined as [1, 2), and the number of segments may be 256. Processor 100 may calculate an index of a specific segment of the plurality of segments, based on the input value $X_1$. Processor 100 may select a specific segment 141 based on the calculated index 120X. In this example, a small value of $X_1$ (e.g., 1.1) would result in a small value of index 120X (e.g., k=25), thereby selecting segment 141 $S_{k=25}$. In a complementary manner, a large value of $X_1$ (e.g., 1.9) would result in a larger value of index 120X (e.g., k=230), thereby selecting segment 141 $S_{k=230}$.

According to some embodiments, system 10 (e.g., processor 100 of IC 101) may retrieve, from LUT circuit 140, a preliminary approximation value 142 of output value $Y_1$ (e.g., $Y(S_k)$) based on the calculated index 120X (k) (e.g., based on selected segment $S_k$).

Pertaining to the example above, when $X_1 = 1.1$, the retrieved preliminary approximation value 142 may be $Y(S_{k=25})$, and when $X_1 = 1.9$, the retrieved preliminary approximation value 142 may be $Y(S_{k=230})$.

As shown in FIGS. 2 and 3, system 10 (e.g., processor 100 of IC 101) may further employ mapping module 120, to calculate an offset value 120FS, representing offset of input value $X_1$ within the selected segment $S_k$. As explained herein, system 10 (e.g., IC 101) may apply a polynomial approximation on offset value 120FS, to improve approximation of output value $Y_1$.

As shown in FIG. 2, system 10 may include at least one polynomial module 130. For example, system 10 may be implemented as an electrical circuit such as an IC 101, and polynomial module 130 may be implemented as a polynomial approximation electrical circuit 130 (or "polynomial circuit 130" for short) within IC 101.

Each polynomial circuit 130 may be associated with a specific mathematical function 40. For example, IC 101 may include a plurality of polynomial circuits 130, each adapted to handle polynomial approximations 130P of respective mathematical functions (e.g., logarithm functions, trigonometric functions, and the like).

Additionally, or alternatively, each polynomial circuit 130 of the one or more polynomial circuits may be associated with (e.g., represent polynomial approximation at) a specific reference segment 141 $S_r$ of the plurality of segments.

Polynomial approximation 130P may be, or may include a data structure (e.g., a numerical vector) that represents coefficients ($C_0, C_1, \ldots C_n$) of a polynomial, such as a Taylor polynomial or Chebyshev polynomial, which approximates a respective mathematical function 40 of interest (e.g., the mathematical function 40 of query 41) as in Eq. 6 below:

$$Y = C_0 + C_1 \cdot X + \ldots C_n \cdot X^n \qquad \text{Eq. 6}$$

According to some embodiments, polynomial circuit 130 may be configured to calculate a polynomial approximation 130P of the mathematical function 40 over one or more (e.g., a single) segment 141 (hereby referred to as a "reference segment", e.g., $S_r$) of the plurality of segments 141 ($S_0$, $S_1, \ldots S_n$).

Additionally, or alternatively, polynomial approximation(s) 130P of one or more mathematical functions, may be calculated over one or more reference segments $S_r$ in an offline process, e.g., by at least one polynomial computing module 320 of an associated computing device 11, as elaborated herein.

According to some embodiments, system 10 (e.g., processor 100 of IC 101) may employ polynomial circuit 130, to apply the at least one polynomial 130P on offset value 120FS, to obtain a correction value 130CR. In other words, polynomial circuit 130 may introduce offset value 120FS as the input variable X of Eq. 6, to obtain correction value 130CR as output value Y. As shown in FIG. 3, correction value 130CR may represent a change, or refinement of approximated output value $Y_1$, due to offset 120FS.

It may be appreciated that reference segment 141 (e.g., ($S_r$), the segment over which polynomial approximation 130P was calculated) may (or may not) be different from the selected segment 141 (e.g., ($S_k$), the segment to where $X_1$ was mapped). In other words, system 10 may refine the approximation of output value $Y_1$, based on a polynomial that was calculated for another segment.

According to some embodiments, processor 100 may obtain, or calculate, for one or more (e.g., each) pair of segments 141, a similarity value 316, representing similarity in behaviour between each segment 141 of the pair. Similarity value 316 may represent, for example, similarity in a tendency (e.g., incline, decline) of function 40 between two compared segments 141, fluctuation or variability of function 40 between two compared segments 141, existence of singular points within the compared segment 141, and the like.

According to some embodiments, system 10 may allow calculation of correction value 130CR when a behaviour of the mathematical function is sufficiently similar between the reference segment $S_r$ 141 and the selected segment $S_k$ 141, according to the predetermined similarity value 316.

Additionally, or alternatively, system 10 may choose a different segment $S_r$ 141, e.g., require calculation of correction value 130CR based on a polynomial approximation 130P of another (e.g., a second) reference segment $S_r$ 141, when behaviour of the mathematical function 40 is not sufficiently similar between the first reference segment $S_r$ 141 and the selected segment $S_k$ 141.

In other words, the at least one polynomial 130P may include a first polynomial 130P, pertaining to a first reference segment 141 $S_r$ and a second polynomial 130P, pertaining to a second reference segment 141 $S_r$. System 10 may calculate a first similarity value 316, representing similarity in behaviour between the selected segment 141 $S_k$ and the first reference segment, and calculate a second similarity value 316, representing similarity in behaviour between the selected segment 141 $S_k$ and the second reference segment. System 10 may subsequently choose a specific reference segment (e.g., first or second reference segment 141 $S_r$) based on the first similarity value 316 and second similarity value 316, and calculate the correction value 130CR based on the polynomial 130P pertaining to the chosen reference segment.

According to some embodiments, system 10 (e.g., processor 100 of IC 101) may subsequently compute output value 150 ($Y_1$) based on (a) the preliminary, LUT-based, approximation 142, and (b) the correction value 130CR, as in Eq. 7 below:

$$Y_1 = Y_{LUT\_APPROXIMATION} + Y_{POLYNOMIAL\_CORRECTION} \qquad \text{Eq. 7}$$

where $Y_{LUT\_APPROXIMATION}$ is LUT approximation 142, and $Y_{POLYNOMIAL\_CORRECTION}$ is correction value 130CR.

In another example, output value 150 ($Y_1$) may be calculated as a weighted sum of LUT approximation 142 and correction value 130CR. Other options are also possible.

According to some embodiments, system 10 (processor 100 of IC 101) may then apply a projection algorithm on the output value $Y_1$, as depicted in FIG. 3, to calculate target value $Y_0$ of the mathematical function 40 at the arbitrary input value $X_0$. Processor 100 may then provide the target value $Y_0$ as a response 10RES to the initial computational query 41.

In the non-limiting example of a logarithmic mathematical function 40, system 10 may calculate target value $Y_0$ according to Eq. 5, above ($Y_0 = Y_1 + (n \times \log(2))$): In this example, processor 100 may retrieve mapping operator value 143 (e.g., $n \times \log(2)$) from LUT circuit 140, and compute response $Y_0$ 10RES for computational query 41 of the mathematical function 40, over the initial, arbitrary range $I_0$, based on output value 150 ($Y_1$) and operator value 143.

Figure 4:
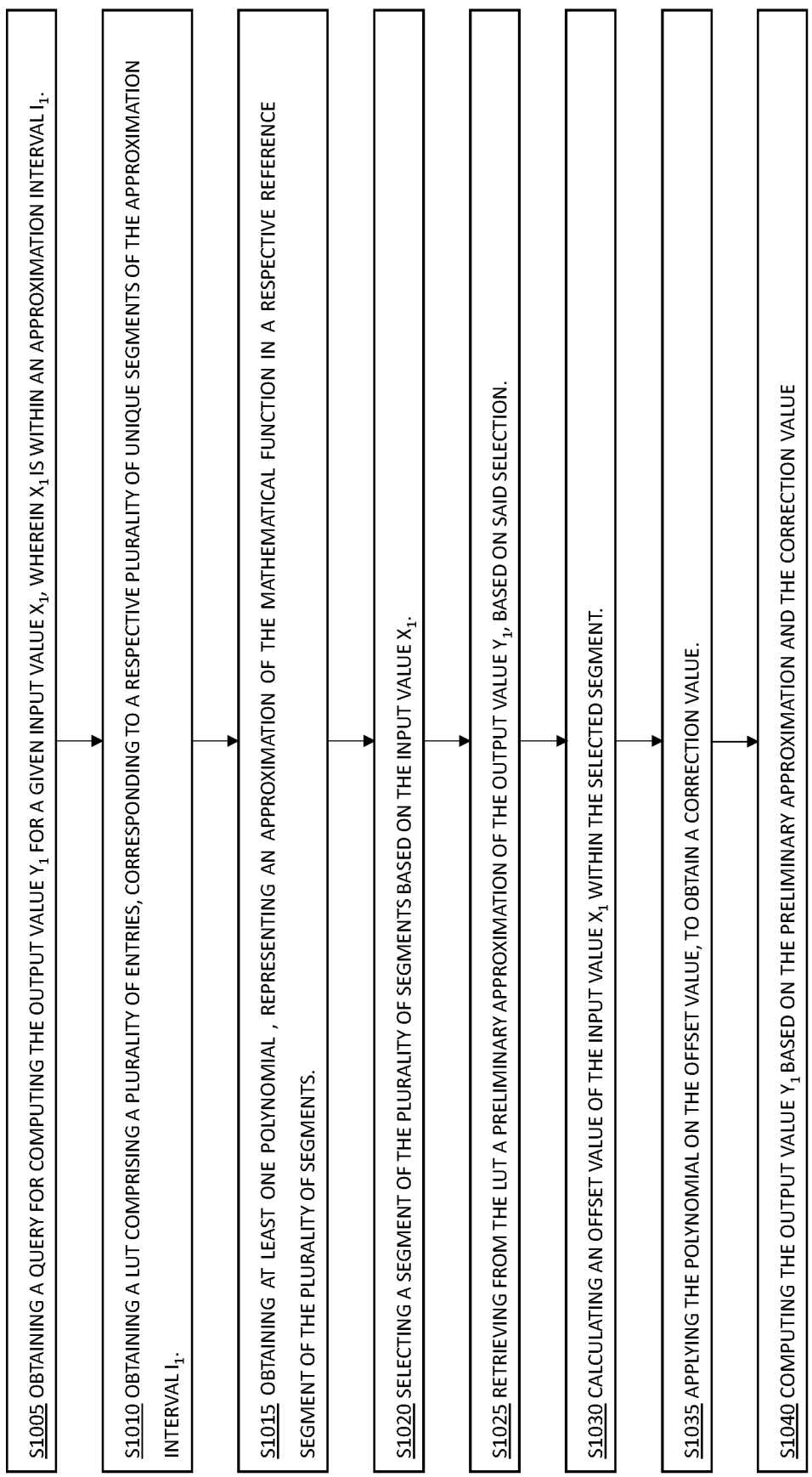
FIG. 4 is a flow diagram depicting stages in a method of computing an output value of a mathematical function, according to some embodiments of the invention.

Reference is now made to FIG. 4, which is a flow diagram depicting stages in a method of computing an output value of a mathematical function 40 by at least one processor (e.g., processor 100 of FIG. 2), according to some embodiments of the invention.

As shown in step S1005, the at least one processor 100 may obtain a query (e.g., computational query 42 of FIG. 2), for computing the output value $Y_1$ of the mathematical function 40 (e.g., element 150 of FIG. 2) for a given input value $X_1$, wherein $X_1$ is within an approximation interval $I_1$.

As shown in step S1010, embodiments of the invention may include obtaining at least one LUT (e.g., LUT circuit 140 of FIG. 2), associated with the mathematical function 40 of computational query 42. LUT 140 may include a plurality of entries, each corresponding to a respective segment (e.g., element 141 of FIGS. 2, 3) of a plurality of unique segments 141 within approximation interval $I_1$.

As shown in step S1015, embodiments of the invention may include obtaining at least one polynomial, representing an approximation of the mathematical function 40 in a respective reference segment 141 (e.g., $S_r$ of FIG. 3) of the plurality of segments 141.

As shown in step S1020, the at least one processor 100 may select a segment 141 (e.g., $S_k$ of FIG. 3) of the plurality of segments 141, based on the input value $X_1$. The at least one processor may then (step S1025) retrieve, from LUT 140 a preliminary approximation of the output value $Y_1$, (e.g., element 142 of FIG. 2), based on said segment selection.

As shown in step S1030, the at least one processor 100 may calculate an offset value (e.g., Offset 120FS of FIGS. 2, 3) of the input value $X_1$ within the selected segment 141 $S_k$.

The at least one processor may then apply (step S1035) the at least one polynomial circuit 130 on offset value 120FS, to obtain a correction value (e.g., 130CR of FIGS. 2, 3).

For example, and as elaborated herein, polynomial circuit 130 may be adapted to apply polynomial approximation 130P on offset value 120FS according to Eq. 6, to produce correction value 130CR.

The at least one processor may subsequently compute (step S1040) the output value 150 ($Y_1$) based on (i) preliminary approximation value 142 and (ii) correction value 130CR.

As discussed herein, a tradeoff exists between (i) the number and size of segments (e.g., depth of LUT circuit 140), (ii) a degree of polynomial approximation 130P, (iii) accuracy of approximation of output 150 ($Y_1$), and (iv) computational resource consumption of system 10, such as logic and memory area, of IC 101, and computing cycles of processor 100.

For example: a large number of segments 141 will reduce quantization errors in the LUT approximation, but will also require a deeper LUT 140, resulting in larger area consumption by LUT circuit 140.

Additionally, segmenting approximation interval $I_1$ to more segments 141, will result in smaller segments 141 (e.g., smaller reference segment(s) $S_r$). This will allow system 10 to maintain accuracy of the polynomial approximation 130P, while using lower-degree polynomials, thereby easing consumption of computing resources.

It may therefore be appreciated that elements of system 10, such as LUT circuit(s) 140 and polynomial calculation circuit(s) 130 may be optimized, to fabricate IC 101 in accordance with predetermined requirements of accuracy and resource consumption.

According to some embodiments, IC 101 may be associated with, or communicatively connected to computing device 11. As explained herein (e.g., in relation to FIG. 2), Computing device 11 may employ a first optimization module 30 (denoted 30A) to calculate an optimal configuration 30CNF of one or more components (e.g., LUT circuit(s) 140, polynomial circuit(s) 130) of IC 101. The calculated optimal configuration 30CNF may be communicated to one or more on-chip processors 100, and applied, by the one or more on-chip processors 100 on the respective components.

Additionally, or alternatively, IC 101 may include one or more reconfigurable elements. The one or more on-chip processors 100 may themselves employ one or more respective optimization modules 30 (denoted 30B) to calculate optimal configuration 30CNF of one or more components (e.g., LUT circuit(s) 140, polynomial circuit(s) 130), as elaborated herein. The one or more on-chip processors 100 may subsequently reconfigure process of IC 101, to apply the calculated, optimal configuration 30CNF of the respective components.

According to some embodiments, optimization module 30 may receive (e.g., via input 7 of FIG. 1) at least one accuracy requirement 30PR, defining a maximal value of an error metric for approximating the mathematical function 40. For example, the value of an error metric 30PR may include, for example a maximal approximation error of a polynomial approximation 130P, a maximal quantization error of LUT 140, and the like Additionally, or alternatively, optimization module 30 may receive at least one computational resource requirement 30CR, defining a constraint of computational resource in approximating the mathematical function 40. The computational resource requirement 30CR may include, for example, a limitation of logic and/or memory area on IC 101, a limitation of power consumption of IC 101, a limitation of a number of computing cycles required by processor 100 in IC 101, and the like.

According to some embodiments, optimization module 30 (LUT optimization module 310) may calculate an optimal configuration of LUT circuit 140 by determining a number of entries of the LUT 140 (each associated with a respective segment 141 of $I_1$) based on (a) the at least one accuracy requirement, and (b) the at least one resource requirement, as elaborated herein. Processor 100/111 may proceed to calculate, for each entry of LUT 140, a value of output $Y_1$ at the corresponding segment.

For example, a small number of entries will result in a small number of relatively large segments 141. This may satisfy a computational resource requirement 30CR for a maximal area of LUT 140. However, on the other hand, a small number of entries may also incur a large quantization error of LUT approximation value 142, and produce polynomial approximation 130P having poor accuracy. LUT optimization module 310 may therefore be adapted to define optimal configuration 30CNF as an optimal number of entries of LUT 140, to optimally satisfy these contradicting requirements.

As explained herein, segments 141 of interval I1 may not be even in length. For example, a first region of interval $I_1$, where the mathematical function exhibits strong fluctuations or irregularities may be divided into smaller segments 141, whereas a second region of interval $I_1$, where the mathematical function 40 exhibits a more regular, or smooth behaviour may be divided to fewer, larger segments 141.

In other words, when function 40 has sections where it changes rapidly (e.g., high curvature or steep gradients), smaller subintervals may enable better local approximations with lower polynomial degrees, resulting in higher accuracy. Conversely, in regions where function 40 is relatively flat or smooth, larger subintervals can be used because the polynomial approximation can remain accurate over a larger range, thereby reducing the number of intervals and the size of the LUT 140.

Some regions of the function may require higher accuracy (for example, near zero for logarithmic or exponential functions). By using smaller subintervals in those regions, the LUT 140 approximation combined with minimax polynomials 130P can achieve the desired accuracy with minimal resource consumption.

In some cases, the optimal placement of subintervals could resemble a non-uniform distribution similar to Chebyshev nodes. This could reduce the overall approximation error by concentrating subintervals 141 where function 40 is most sensitive to changes, thus mimicking the behavior of Chebyshev minimax approximations.

Additionally, or alternatively, embodiments of the invention may adjust subinterval 141 lengths such that the approximation error is equally distributed across all subintervals. This strategy ensures that no subinterval disproportionately contributes to the overall approximation error.

According to some embodiments, optimization module 30 may calculate a complexity value 312, representing variation (e.g., sharp curvature, rapid changes, inflection points, and the like) of the mathematical function at one or more locations or regions along approximation interval $I_1$.

For example, when complexity value 312 in a region of segments 141 is low (e.g., representing a smooth function), the length 314 of these segments may be relatively large.

In a complementary manner, when complexity value 312 in a region of segments 141 is high (e.g., representing variations or in the function's behaviour), the length 314 of these segments may be relatively small.

Optimization module 30 may subsequently determine optimal configuration 30CNF as a length 314 of one or more segments of the plurality of segments of LUT 140, based on complexity value 312.

According to some embodiments, optimization module 30 may include a polynomial calculation module 320. Polynomial calculation module 320 may be adapted to receive accuracy requirement 30PR, defining a minimal value of an error metric for approximating the mathematical function 40 within at least one reference segment $S_r$, and/or at least one computational resource requirement 30CR, defining a constraint of computational resource in approximating the mathematical function 40.

As elaborated herein, polynomial calculation module 320 may calculate an optimal polynomial approximation 130P, e.g., as one that has an optimal (e.g., a minimal) polynomial degree D, in accordance with requirements 30PR and/or 30CR. Polynomial calculation module 320 may provide the optimal polynomial approximation 130P as part of the calculated optimal configuration 30CNF.

For example, polynomial calculation module 320 may initially determine an initial, minimal degree D of polynomial approximation 130P based on the accuracy requirement. It may be appreciated that a large degree D may facilitate better fitting (e.g., reduce polynomial approximation error) of polynomial approximation 130P to the underlying mathematical function 40, but may also incur additional computational resources (e.g., memory and computation cycles). Polynomial calculation module 320 may therefore employ an iterative process to calculate the polynomial. Each iteration of the iterative process may include the following steps:

Polynomial calculation module 320 may calculate a current polynomial approximation 130P (e.g., coefficients C1, ..., Cn of an interim polynomial, as in Eq. 6), having a current degree, and adapted to approximate the mathematical function 40 over the reference segment, as known in the art. Polynomial calculation module 320 may calculate an error value, representing the current, interim polynomial's error in approximating the mathematical function 40 within the reference segment. Polynomial calculation module 320 may and (iii) increasing the polynomial degree, and repeat the iterative process, until the polynomial's approximation error value satisfies the accuracy requirement 30PR, and as long as computational resource requirements 30CR (e.g., memory and computation cycles) are satisfied, to obtain a final version of the polynomial 130P.

Additionally, or alternatively, polynomial calculation module 320 may calculate for one or more (e.g., each) pair of segments 141, a similarity value 316, as explained herein. Polynomial calculation module 320 may subsequently include, as part of the calculated optimal configuration 30CNF, an association between specific segments 141 ($S_0$, $S_1$, ... $S_n$) of LUT 140 and corresponding, representative reference segments 141 $S_r$ based on (e.g., having the highest) common similarity value 316.

According to some embodiments, optimization module 30 may communicate optimal configuration 30CNF to modules of system 10, to enforce or reconfigure modules of IC 101 so as to operate in accordance with optimal configuration 30CNF.

For example, IC 101 may be a configurable device such as a CGRA or FPGA, and may include one or more configurable components such as configurable LUT circuit(s) 140 and/or configurable polynomial circuit(s) 130. In such embodiments, at least one on-chip processor 100 may calculate optimal configuration 30CNF, and/or receive calculated optimal configuration 30CNF from an associated computing device. On-chip processor 100 may subsequently reconfigure one or more of the configurable components (e.g., polynomial circuit 130, LUT circuit 140), to change a structure, and/or operation of the configurable components, in accordance with the calculated optimal configuration 30CNF. For example, optimal configuration 30CNF may be applied such that the number of entries in LUT circuit 140 may be determined based on (i) required accuracy 30PR of the output value $Y_1$, and (ii) computational resource constraint (e.g., area, computing cycles) 30CR on the IC 101 device.

In another example, IC 101 may be an Application-Specific Integrated Circuit (ASIC). In such embodiments, computing device 11 may calculate optimal configuration 30CNF as explained herein, and produce a design schematic of one or more components (e.g., polynomial circuit 130, LUT circuit 140, on-chip processor 100) in accordance with the calculated optimal configuration 30CNF as elaborated herein (e.g., in relation to FIG. 5).

For example, optimal configuration 30CNF may include a required precision (single/double precision) representation of polynomial 130P, a degree of polynomial 130P, a number of coefficients of polynomial 130P, a rounding of coefficients of polynomial 130P, and the like. Schematic of polynomial circuit 130 may represent electrical components (e.g., registers, multipliers, adders, multiplexers, and the like) that may be required, as known in the art, to implement polynomial approximation function 130P as in Eq. 6 ($C_0$+ $C_1 \cdot X$+ ... $C_n \cdot X^n$) according to optimal configuration 30CNF.

The design schematic (e.g., of polynomial circuit 130, LUT circuit 140, on-chip processor 100) may be translatable into a physical layout design, allowing fabrication of IC 101, as known in the art.

Figure 5:
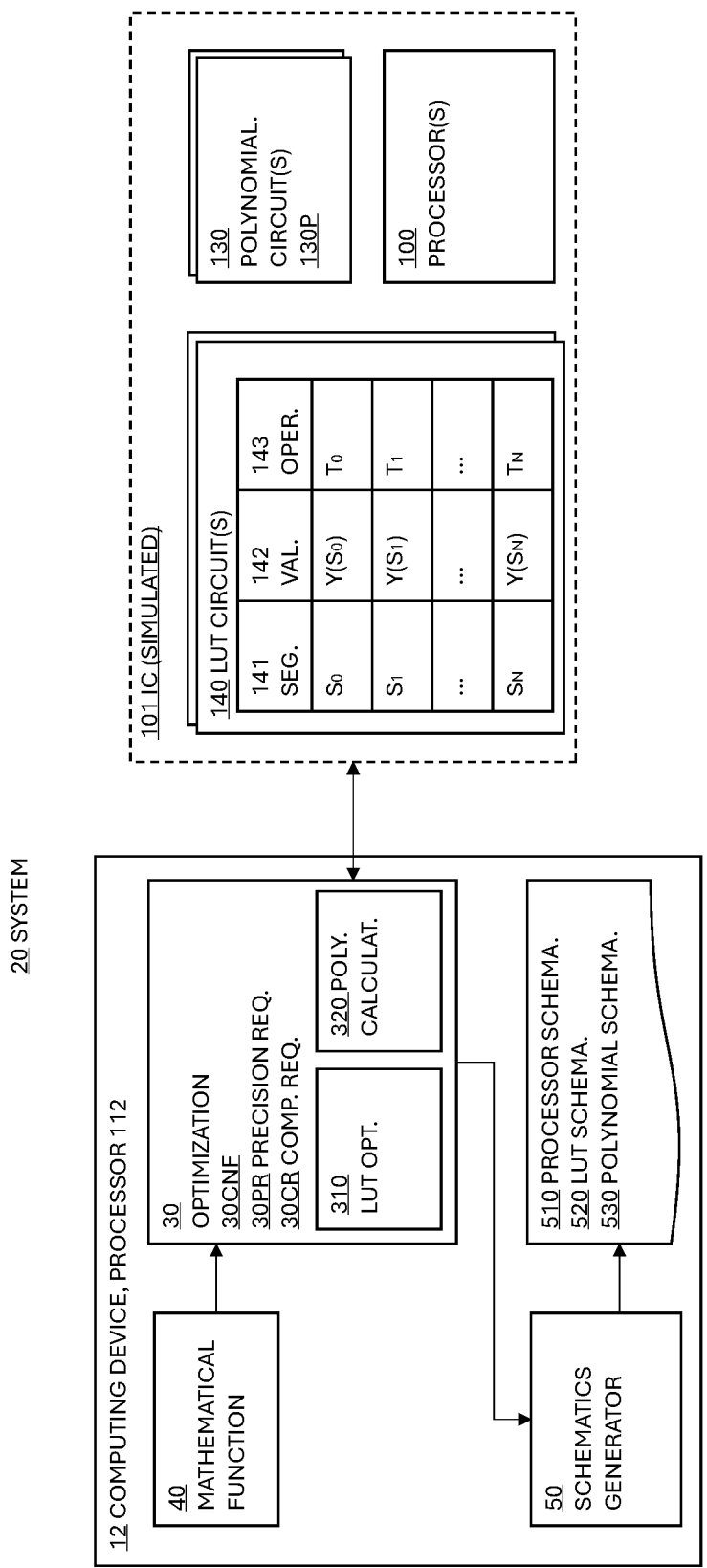
FIG. 5 is a block diagram depicting a system for designing an IC, adapted to output value of a mathematical function, according to some embodiments of the invention.

Reference is now made to FIG. 5, which is a block diagram depicting a system 20 for designing an IC, such as IC 101 of FIG. 2, for calculating an output value of a mathematical function 40, according to some embodiments of the invention.

According to some embodiments, system 20 may be the same as system 10 of FIG. 2, and may be implemented as a software module, a hardware module, or any combination thereof.

Additionally, or alternatively, system 20 may be, or may include a computing device 12 such as element 1 of FIG. 1, having a processor 112 such as processor 2 of FIG. 1. Computing device 12 may be the same as computing device 12 of FIG. 2.

Computing device 12 may be adapted to execute one or more modules of executable code (e.g., element 5 of FIG. 1) to design, or simulate an IC, as known in the art.

In the context of the present invention, computing device 12 may be configured to design, or simulate IC 101 for calculating an output value (e.g., 10RES of FIG. 2) of a mathematical function 40, as described herein.

Arrows of FIG. 5 may represent flow of one or more data elements to and from system 20 and/or among modules or elements of system 20. Some arrows have been omitted on FIG. 5 for the purpose of clarity.

As shown in FIG. 5, system 20 may include an optimization module 30, which may be the same as optimization module 30 of FIG. 2. System 20 may employ optimization module 30, to calculate an optimal configuration 30CNF of one or more components of IC 101, as elaborated herein.

According to some embodiments, computing device 12 may simulate functionality of IC 101, for calculating an output value 10RES of a mathematical function 40, under constraints of accuracy 30PR and computational requirements 30CR, to determine optimal configuration 30CNF, and optimize a structure of one or more components of IC 101, prior to manufacture. Computing device 12 may subsequently employ a schematic generator module or application as known in the art, to produce a schematic of one or more modules of IC 101.

As shown in FIG. 5, system 20 may obtain (e.g., from input 7 of FIG. 1) a definition of the mathematical function 40 over an approximation interval $I_1$.

Additionally, or alternatively, system 20 may receive (e.g., from input 7 of FIG. 1) one or more requirements or constraints 30CR pertaining to computational resources of IC 101, including, for example, logic and memory area on IC 101, power consumption of IC 101, a number of computing cycles required by an on-chip processor 100 of IC 101, and the like.

Additionally, or alternatively, optimization module 30 may receive (e.g., from input 7 of FIG. 1) one or more requirements 30PR for accuracy of approximated value 150 of $Y_1$ by IC 101. Accuracy requirement 30PR may define a maximal allowable value for an error metric for approximating the output value $Y_1$, including for example a maximal approximation error of a polynomial approximation 130P, a maximal quantization error of LUT 140, and the like.

As elaborated herein, optimization module 30 may calculate an optimal configuration 30CNF of LUT circuit 140 based on the at least one resource requirement 30CR and the at least one accuracy requirement 30PR. This optimal configuration 30CNF may include for example a number of segments 141, a length of one or more segments 141, and the like.

Schematics generator module may subsequently generate, based on this optimal configuration 30CNF, a LUT schematic 520. LUT schematic 520 may represent a LUT circuit 140 that includes a plurality of entries, in accordance with calculated optimal configuration 30CNF:

Each entry of the LUT circuit 140 may correspond to a respective, unique segment of the approximation interval $I_1$. Each entry of the LUT circuit 140 may be adapted to maintain a precalculated value of output $Y_1$ at the corresponding segment (e.g., at an endpoint of that segment). LUT circuit 140 may comply with optimal configuration 30CNF by having the optimal, calculated number of entries (corresponding to optimal number of segments). Each entry of the LUT circuit 140 may comply with optimal configuration 30CNF by having the optimal calculated length.

Additionally, or alternatively, optimal configuration 30CNF may include one or more optimal (e.g., having a minimal degree) polynomial approximations 130P, corresponding to one or more respective reference segments Sr, as elaborated herein.

Schematics generator module 50 may subsequently generate, based on this optimal configuration 30CNF a polynomial schematic, representing a polynomial circuit 130 that is adapted to calculate a polynomial estimation of the mathematical function 40 (e.g., correction value 130CR of FIG. 2 and FIG. 3) in a reference segment of the plurality of segments.

In other words, schematics generator module 50 may generate the polynomial schematic such that polynomial circuit 130 may calculate the polynomial estimation (e.g., correction value 130CR) of mathematical function 40, based on the final version of the iterative polynomial calculation process.

Polynomial circuit 130 may comply with optimal configuration 30CNF by calculating the polynomial estimation (e.g., correction value 130CR), in accordance with the at least one accuracy requirement 30PR, e.g., having a polynomial approximation error that does not exceed a predetermined threshold.

Each entry of the LUT circuit 140 may further comply with optimal configuration 30CNF by being associated with a proper, representative reference segment $S_r$ (and the corresponding polynomial approximation 130P), based on similarity metric 316.

According to some embodiments, schematics generator module 50 may generate at least one processor schematic, representing at least one respective on-chip processor 100, as known in the art.

Processor schematic 510, polynomial schematic 530, and LUT schematic 520 may be adapted to be translated into a physical layout design, respectively representing one or more on-chip processors 100, polynomial circuits 130 and LUT circuits 140. As known in the art, this physical layout design may be utilized for fabricating IC 101, e.g., as an ASIC device. The fabricated IC 101 may thereby be configured to approximate an output value ($Y_1$ 150 and/or $Y_0$ 10RES) of mathematical function 40.

The at least one respective on-chip processor 100 may be adapted to be in communication with the one or more LUT circuits 140 and one or more polynomial circuits 130, as depicted in FIG. 2.

Additionally, or alternatively, computing device 12 may produce one or more modules of instruction code (e.g., element 5 of FIG. 1), that may be executable by the at least one on-chip processor 100.

Upon execution of the modules of instruction code 5, the at least one processor 100 may be configured to employ the one or more LUT circuits 140 and the one or more polynomial circuits 130 so as to approximate the output value $Y_1$ of mathematical function 40, over interval $I_1$ (element 150 of FIG. 2), as explained herein.

Additionally, or alternatively, upon execution of the modules of instruction code 5, the at least one processor 100 may be configured to calculate an output value $Y_0$ of mathematical function 40, over arbitrary interval $I_0$ (element 10RES of FIG. 2), as explained herein.

In other words, upon execution of the modules of instruction code 5, the at least one processor 100 may be configured to: (i) retrieve a preliminary approximation 142 of output value $Y_1$ from an LUT circuit pertaining to the mathematical function 40; (ii) calculate an offset value (120FS of FIG. 2 and FIG. 3) of input value $X_1$ within the selected segment 141 of $I_1$; (iii) employ a polynomial circuit 130, pertaining to the mathematical function 40 on the offset value, to obtain a correction value (130CR of FIG. 2 and FIG. 3); and (iv) compute the value 150 $Y_1$ based on the preliminary approximation 142 and the correction value 130CR, as elaborated herein.

As explained herein, LUT optimization module 310 may be configured to determine an optimal configuration 30CNF, defining a structure of LUT circuit 140 for approximating Y1, while balancing requirements of accuracy 30PR and computing resource consumption 30CR.

The size of LUT 140 may be determined by the number of segments 141 into which the function's domain (e.g., approximation interval $I_1$) is divided, the size of each segment 141, and the degree D of the polynomial 130P used for approximation within each segment 141.

Increasing the number of segments 141 in LUT 140 may result in smaller segments 141, which can reduce the complexity of the polynomial required for each segment 141. This may enhance an overall accuracy of approximated value 150 ($Y_1$), because the polynomial 130P may handle smaller intervals more effectively.

Additionally, polynomial approximations 130P used within each segment 141 can be of lower degree, because the underlying mathematical function 40 may vary less over a smaller range.

On the other hand, a large number of segments 141 may incur a larger LUT circuit 140 size, which may, in turn, increase memory usage and area consumption, possibly failing to meet computational resource requirements 30CR.

It should also be noted that approximating a continuous function over an interval (e.g., $I_1$) by dividing it into smaller segments 141 and using a LUT 140 to map these segments 141 to specific points may introduce quantization errors.

LUT optimization module 310 may calculate the accuracy of LUT approximation value 142, by estimating the function's variation within each segment 141.

For example, a first-order approximation of a quantization error within a segment 141 can be expressed as in Eq. 8, below:

$$E_{LUT}(x) \approx \Delta x/2 |f'(x)| \qquad \text{Eq. 8}$$

where $E_{LUT}$ represents the quantization error, $\Delta x$ represents length 314 of the relevant segment 141, and f'(x) represents the derivative of mathematical function 40 in that segment 141.

As explained herein, the behaviour of mathematical function 40 in each segment 141 may be approximated using a polynomial approximation 130P. The error introduced by the polynomial approximation may depend upon the polynomial approximation's 130P degree, and upon how well it matches the mathematical function within that segment 141.

The total approximation error due to the polynomial approximation over all segments 141 can be bounded using known results from approximation theory. For a sufficiently smooth function (e.g., continuous with bounded derivatives), the error of a minimax polynomial of degree D can be estimated as in Eq. 9, below:

$$E_{POLY} \in O\!\left((K/D^2) \cdot (\Delta x)^{D+1}\right) \qquad \text{Eq. 9}$$

where K is a factor which reflects the smoothness and behavior of the function.

The total approximation error of polynomial 130P may therefore be calculated as a total error $E_{TOT}$ of approximation of the mathematical function's 40 within segment 141, and may include a combination (e.g., a sum) of the LUT quantization error $E_{LUT}$, the evaluation error EEVAL that arises due to evaluation of the polynomial and rounding of the coefficients to the working precision, and the polynomial approximation error $E_{POLY}$, e.g., as in Eq. 10:

$$E_{TOT} = E_{POLY} + EEVAL + E_{LUT} \qquad \text{Eq. 10}$$

LUT optimization module 310 may therefore adjust the number of LUT 140 segments 141, a size of LUT 140 segments 141, a degree of polynomial approximation 130P, to achieve a balance between high accuracy requirements 30PR in approximation of function 40, while maintaining efficient utilization of computational resources, according to computational resource requirements 30CR.

As explained herein, Polynomial calculation module 320 may be configured to enhance accuracy of function 40 approximation by adjusting the degree of polynomial 130P.

A polynomial of degree n consists of n+1 terms. By increasing the degree of the polynomial, polynomial calculation module 320 may introduce more coefficients (terms) that can be fine-tuned to minimize the error between polynomial 130P and the target function 40. This higher degree polynomial has greater flexibility to "track" oscillations of the target function 40, thereby reducing the amplitude of these oscillations and consequently lowering the maximal polynomial approximation error $E_{POLY}$.

Certain functions exhibit complex behaviors, such as curvature, rapid changes, or inflection points. A polynomial with a low degree may not have sufficient terms to accurately capture this complexity. Higher degree minimax polynomials or Chebyshev polynomials may distribute the error more evenly across the interval, resulting in a smaller overall maximum error.

However, while increasing the polynomial degree improves accuracy, it can also introduce numerical instability, especially near boundaries of interval 141. Therefore, polynomial calculation module 320 may carefully balance the degree of the polynomial 130P to avoid such instabilities.

To determine an optimal degree of the polynomial, polynomial calculation module 320 may incrementally increase the degree, until the approximation error $E_{POLY}$ falls below a predetermined target accuracy (e.g., defined by 30PR). Polynomial calculation module 320 may simultaneously monitor the total error $E_{TOT}$, to ensure that it remains within a predetermined desired accuracy threshold (e.g., defined by 30PR).

Additionally, polynomial calculation module 320 may account for errors due to rounding of coefficients to the working precision.

Polynomial calculation module 320 may thus strike a balance between adding flexibility for better approximation and managing computational cost and stability to avoid excessive evaluation errors.

Figure 6:
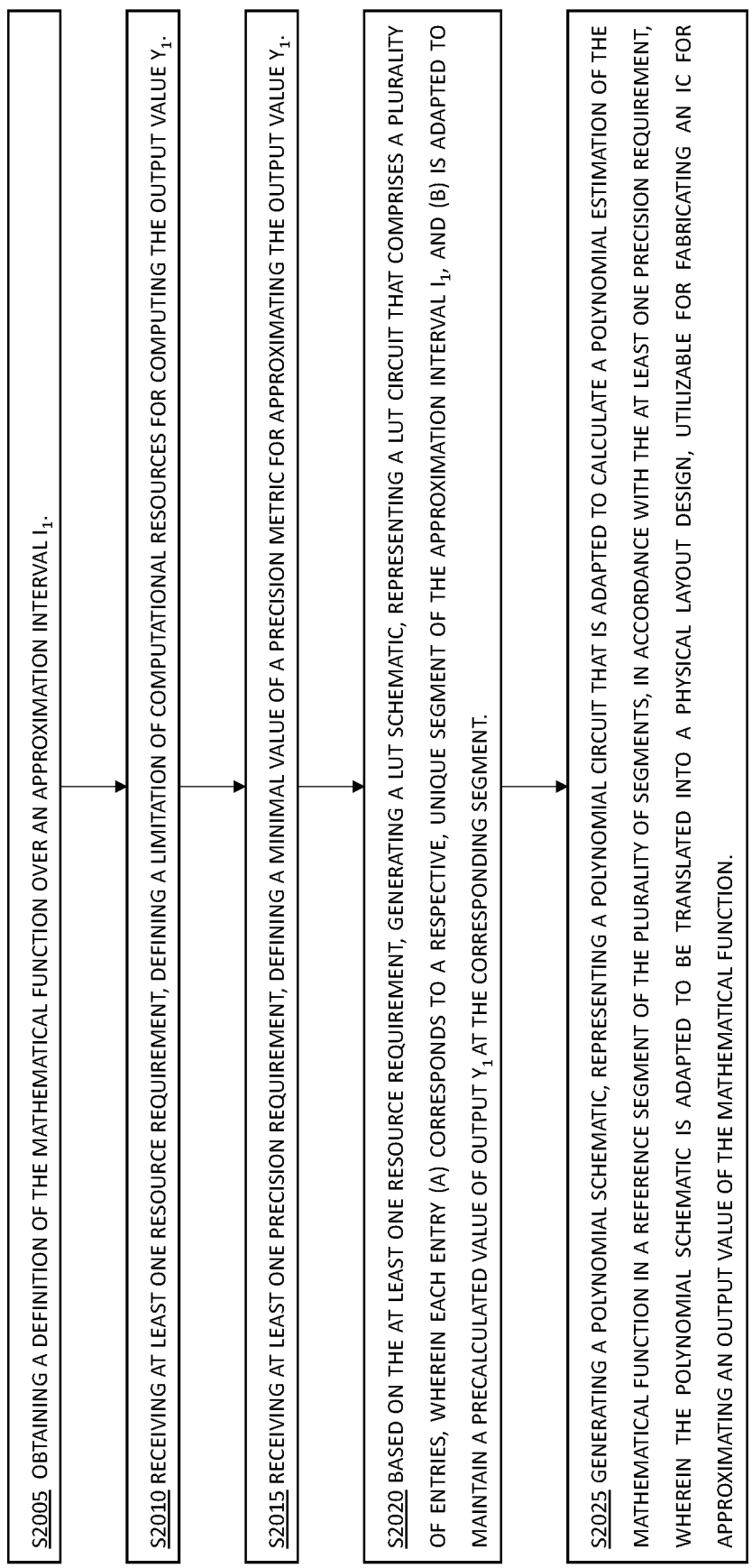
FIG. 6 is a flow diagram depicting stages in a method of designing an IC, for calculating an output value of a mathematical function, according to some embodiments of the invention.

Reference is now made to FIG. 6, which is a flow diagram depicting stages in a method of designing an IC (e.g., system or IC device of FIG. 2) for calculating an output value of a mathematical function 40, according to some embodiments of the invention.

As shown in step S2005, at least one processor such as processor 2 of FIG. 1 (e.g., processor 111 of FIG. 2, processor 112 of FIG. 5) may obtain a definition of the mathematical function 40 (e.g., a logarithmic function, trigonometric function, exponential function, and the like) over an approximation interval $I_1$.

As shown in steps S2010 and S2015, the at least one processor 2 may receive at least one computational resource requirement (e.g., 30CR of FIGS. 2, 5), and/or at least one accuracy requirement (e.g., 30PR of FIGS. 2, 5).

Computational resource requirement 30CR may define one or more limitations of computational resources (e.g., computing cycles, memory, power, and the like) for computing output value $Y_1$. Accuracy requirement 30PR may define a maximal allowable value of an error metric (e.g., a maximal absolute error) for polynomial approximation of output value $Y_1$.

As shown in step S2020, based on the at least one resource requirement, the at least one processor 2 may generate a LUT schematic, representing at least one LUT circuit (e.g., 140 of FIGS. 2, 5).

Each LUT circuit 140 may include a plurality of entries. Each entry may (a) correspond to a respective, unique segment 141 (e.g., $S_0, \ldots, S_N$) of the approximation interval $I_1$. Additionally, or alternatively, each entry may be adapted to maintain a precalculated value (e.g., 142 of FIGS. 2, 5) of result $Y_1$ at the corresponding segment.

As shown in step S2025, the at least one processor 2 may generate a polynomial schematic (e.g., 530 of FIG. 5). Polynomial schematic 530 may represent a polynomial circuit (e.g., 130 of FIGS. 2, 5) that is adapted to calculate a polynomial estimation 130 of mathematical function 40 in a reference segment 141 (e.g., $S_k$) of the plurality of segments 141, in accordance with the at least one accuracy requirement 30PR.

The polynomial schematic may be adapted to be translated into a physical layout design, which may be utilizable, as known in the art, for fabricating an IC. In the context of the present invention, the fabricated IC may be adapted to approximate an output value of the mathematical function, as described herein.

Embodiments of the invention may leverage the combination of Look-Up Table (LUT) based approximation and polynomial approximation, to achieve a balance between computational accuracy and resource efficiency in hardware implementations. This hybrid approach offers several benefits, that may be categorized as enhancement of accuracy, enhancement of computational resource efficiency, and practical application:

As explained herein, LUT-based methods provide precomputed values for specific points within the approximation interval. By subdividing the interval into small sub-segments, the LUT can store highly granular values, significantly reducing quantization errors. The minute size of sub-segments 141 allows embodiments of the invention to perform accurate polynomial approximation within each segment, ensuring high accuracy.

On the other hand, polynomial approximation, such as Taylor or Chebyshev polynomials, can provide a smooth and continuous approximation of the mathematical function within each sub-segment. The small size of the LUT 140 sub-segments 141 may allow embodiments of the invention to effectively use low-degree polynomials, as the function's behaviour within each sub-segment is less complex and more predictable.

Embodiments of the invention may combine LUT and Polynomial approximation such that LUT 140 provides a quick, coarse approximation, while the polynomial correction 130P refines this approximation, resulting in higher overall accuracy. This combination allows the system (e.g., 10, 20) to achieve high accuracy without requiring an excessively large LUT 140, as the polynomial correction compensates for the LUT's limitations.

A pure LUT-based approach with high granularity would require a large memory footprint to store all precomputed values. By combining LUT 140 with polynomial approximation 130P, Embodiments of the invention may reduce the need for a large LUT 140. The polynomial correction can handle finer details, allowing the LUT to be smaller and more manageable. Moreover, the use of small LUT sub-segments 141 allows for the use of low-degree polynomials 130P, which simplifies the polynomial calculations. Simpler calculations translate to lower computational overhead, conservation of hardware resources and improving efficiency and throughput.

Embodiments of the invention may allow for an optimized tradeoff between LUT size, polynomial degree, and overall accuracy. By adjusting the number of LUT entries and the degree of the polynomial, system 10/20 can be tailored to meet specific accuracy and resource constraints. This flexibility may ensure that the hardware implementation can be optimized for different applications, balancing accuracy of the implementation and resource consumption according to predetermined requirements.

Embodiments of the invention can be implemented in hardware, e.g., as one or more integrated circuits (ICs) that may include both LUT 140 and polynomial computation 320 circuits. This hardware solution may ensure fast and efficient computation, making it suitable for real-time applications.

IC(s) 10 can be designed to dynamically adjust the LUT 140 and polynomial 130 parameters, based on the input values and required accuracy, further enhancing efficiency.

Embodiments of the invention may also include a method for designing and generating such an IC 101, ensuring that the hardware is optimized for the specific mathematical functions and application requirements.

This design methodology may allow for the creation of custom ICs 10 that leverage the combined approximation methods, providing a tailored solution for various computational tasks.

In summary, the present invention's combination of LUT-based and polynomial approximation methods in hardware may offer significant benefits in terms of accuracy and computational resource consumption. By leveraging the strengths of both approaches, and utilizing very small LUT sub-segments to enable accurate polynomial approximation with low-degree polynomials, embodiments of the invention may achieve high accuracy while minimizing memory usage and computational overhead. This makes it a practical and efficient solution for a wide range of applications.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of computing an output value $Y_1$ of a mathematical function by at least one processor, the method comprising:
    calculating complexity values representing variation of the mathematical function at regions along an approximation interval $I_1$;
    determining an optimal configuration that includes both a number of entries of a configurable look-up table (LUT) and lengths of a plurality of segments within the approximation interval $I_1$ based on the complexity values and at least one computational resource constraint defining limitations of at least one of logic area and memory area,
    wherein the lengths of respective segments are determined such that segments in regions having higher complexity values have shorter lengths than respective segments in regions having lower complexity values;
    reconfiguring the configurable LUT circuit and the configurable polynomial computation circuit to implement the optimal configuration by dynamically adjusting a number of LUT entries associated with respective segments and modifying polynomial processing elements based on the complexity values and computational resource constraints, wherein the number of LUT entries comprise categories for respective segments, corresponding preliminary approximation values, and corresponding mapping operator values;
    obtaining a query for computing the output value $Y_1$ for a given input value $X_1$, wherein $X_1$ is within an approximation interval $I_1$;
    selecting a segment of the plurality of segments based on the given input value $X_1$;
    retrieving from the configurable LUT a preliminary approximation of the output value $Y_1$, based on said selection;
    calculating an offset value of the given input value $X_1$ within the selected segment;
    applying at least one polynomial using the configurable polynomial computation circuit on the offset value, to obtain a correction value; and
    computing the output value $Y_1$ based on the preliminary approximation and the correction value.

2. The method of claim 1, wherein a length of at least one first segment of the respective plurality of unique segments, and a length of at least one second segment of the respective plurality of unique segments are different.

3. The method of claim 1, wherein determining the optimal configuration further comprises:
    receiving at least one accuracy requirement, defining a maximal value of an error metric for approximating the mathematical function;
    receiving at least one resource requirement, defining a constraint of computational resource in approximating the mathematical function;
    determining the number of entries of the LUT based on the at least one accuracy requirement and the at least one resource requirement; and
    calculating, for each entry of the LUT, a value of output $Y_1$ at the corresponding segment.

4. The method of claim 1, wherein the complexity values represent at least some of curvature, rapid changes, and inflection points of the mathematical function, and wherein the determined segment lengths achieve equal distribution of approximation error across all segments.

5. The method of claim 1, further comprising:
    receiving an accuracy requirement, defining a maximal value of an error metric for approximating the mathematical function within the reference segment;
    based on the accuracy requirement, determining a minimal degree of the polynomial; and
    applying an iterative process to calculate the polynomial, where each iteration includes: (i) calculating the polynomial's error in approximating the mathematical function within the reference segment, and (ii) increasing the polynomial degree until the polynomial's approximation error satisfies the accuracy requirement.

6. The method of claim 5, further comprising:
    receiving at least one resource requirement, defining a constraint of computational resource in approximating the mathematical function within the reference segment; and
    increasing the polynomial degree as long as the computational resource is satisfied.

7. The method of claim 1, wherein obtaining the query for computing the output value $Y_1$ comprises:
    receiving an initial query for calculating a target value $Y_0$ of the mathematical function at an arbitrary input value $X_0$, within an arbitrary interval $I_0$; and
    applying a range reduction algorithm on the arbitrary input value $X_0$, to calculate the given input value $X_1$, wherein the given input value $X_1$ represents the arbitrary input value $X_0$ within the approximation interval $I_1$.

8. The method of claim 7, further comprising:
    applying a projection algorithm on the output value $Y_1$, to calculate the target value $Y_0$ of the mathematical function at the arbitrary input value $X_0$; and
    providing the target value $Y_0$ as a response to the initial query.

9. The method of claim 1, wherein the at least one polynomial comprises a first polynomial, pertaining to a first reference segment and a second polynomial, pertaining to a second reference segment, and wherein the method further comprises:
    calculating a first similarity value, representing similarity in behaviour between the selected segment and the first reference segment;
    calculating a second similarity value, representing similarity in behaviour between the selected segment and the second reference segment;
    choosing a reference segment based on the first similarity value and the second similarity value; and
    calculating the correction value based on the polynomial pertaining to the chosen reference segment.

10. An IC device for computing an output value of a mathematical function, comprising:
- a configurable look-up table (LUT) circuit having a plurality of entries, each corresponding to a plurality of segments of unequal lengths within an approximation interval over which the mathematical function is approximated;
- a configurable polynomial computation circuit; and
- at least one processor configured to:
- calculate complexity values representing variation of the mathematical function at regions along the approximation interval,
- determine an optimal configuration that includes both the number of entries of the configurable LUT circuit and lengths of the plurality of segments within the approximation interval based on the complexity values and at least one computational resource constraint defining limitations of at least one of a logic area of the IC device and a memory area of the IC device,
- wherein the lengths of respective segments are determined such that segments in regions having higher complexity values have shorter lengths than respective segments in regions having lower complexity values, and
- reconfigure the configurable LUT circuit and the configurable polynomial computation circuit to implement the optimal configuration by dynamically adjusting a number of LUT entries associated with respective segments and modifying polynomial processing elements based on the complexity values and computational resource constraints, wherein the number of LUT entries comprise categories for respective segments, corresponding preliminary approximation values, and corresponding mapping operator values.

11. The device of claim 10, wherein the at least one processor is configured to:
- obtain a query for computing the output value $Y_1$;
- select a segment of the plurality of segments, based on an input value $X_1$;
- retrieve, from the LUT circuit, a preliminary approximation of the output value $Y_1$, based on the selected segment;
- calculate an offset of the input value $X_1$ within the selected segment;
- employ the polynomial computation circuit, to calculate a polynomial estimation of the mathematical function on the offset value, thereby obtaining a correction value; and
- compute the output value $Y_1$ based on the preliminary approximation and the correction value.

12. The device of claim 10, wherein the number of entries is determined based on (i) a required accuracy of the output value $Y_1$, and (ii) the computational resource constraint on the device.

* * * * *